US012638972B2

(12) United States Patent
Bangalore Lakshman et al.

(10) Patent No.: US 12,638,972 B2
(45) Date of Patent: May 26, 2026

(54) ANALOG COMPUTING CONFIGURED MEMORY

(71) Applicant: Micron Technology, Inc., Boise, ID (US)

(72) Inventors: Shashank Bangalore Lakshman, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 132 days.

(21) Appl. No.: 18/607,266

(22) Filed: Mar. 15, 2024

(65) Prior Publication Data

US 2024/0329841 A1      Oct. 3, 2024

Related U.S. Application Data

(60) Provisional application No. 63/455,116, filed on Mar. 28, 2023.

(51) Int. Cl.
*G06F 3/06* (2006.01)
*G06N 20/00* (2019.01)

(52) U.S. Cl.
CPC .......... *G06F 3/0611* (2013.01); *G06F 3/0659* (2013.01); *G06F 3/0679* (2013.01); *G06N 20/00* (2019.01)

(58) Field of Classification Search
CPC .... G06F 3/0611; G06F 3/0659; G06F 3/0679; G06N 3/065; G06N 3/08; G06N 20/00
See application file for complete search history.

(56) References Cited

U.S. PATENT DOCUMENTS

| | | | | |
|---|---|---|---|---|
| 2020/0117982 | A1* | 4/2020 | Chiu | G06F 5/08 |
| 2021/0110297 | A1* | 4/2021 | Gattani | G06N 3/105 |
| 2021/0143115 | A1* | 5/2021 | Wu | H01L 25/50 |
| 2021/0342749 | A1* | 11/2021 | Wang | G06N 20/20 |
| 2022/0012580 | A1* | 1/2022 | Srivastava | G11C 11/4096 |

\* cited by examiner

*Primary Examiner* — Larry T Mackall
(74) *Attorney, Agent, or Firm* — Holland & Hart LLP

(57) ABSTRACT

Methods, systems, and devices for analog computing configured memory are described. A memory system may implement a non-volatile memory array that includes a first portion of memory cells configured for storing data, and a second portion of memory cells configured to perform analog computing operations associated with a machine learning operation. The memory system may include supporting circuitry for receiving and storing data to the first portion, and transferring the data stored in the first portion to the second portion for use in the analog computing operations without transferring the data to a memory system controller. The memory system may include computing circuitry configured to generate data for the machine learning operation based on the outputs of the analog computing operations performed at the second portion. The computing circuitry may store the generated data to the first portion or transmit the generated data to the memory system controller.

18 Claims, 5 Drawing Sheets

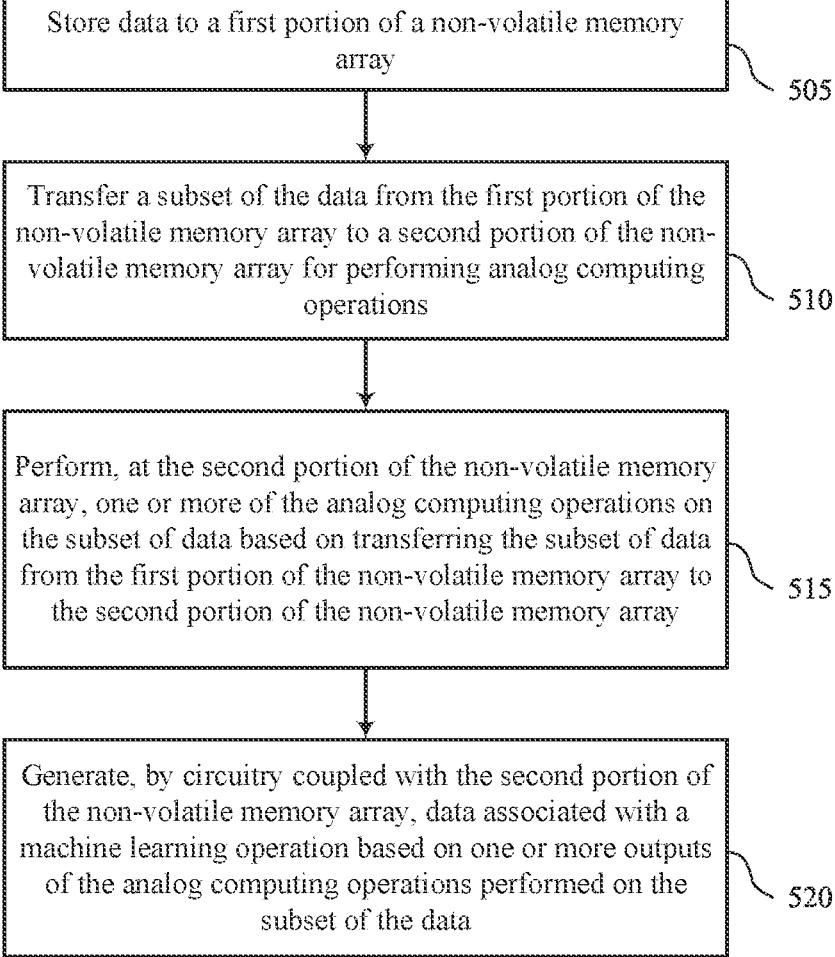

Store data to a first portion of a non-volatile memory array

505

Transfer a subset of the data from the first portion of the non-volatile memory array to a second portion of the non-volatile memory array for performing analog computing operations

510

Perform, at the second portion of the non-volatile memory array, one or more of the analog computing operations on the subset of data based on transferring the subset of data from the first portion of the non-volatile memory array to the second portion of the non-volatile memory array

515

Generate, by circuitry coupled with the second portion of the non-volatile memory array, data associated with a machine learning operation based on one or more outputs of the analog computing operations performed on the subset of the data

ANALOG COMPUTING CONFIGURED MEMORY

CROSS REFERENCE

The present application for patent claims priority to U.S. Patent Application No. 63/455,116 by BANGALORE LAKSHMAN et al., entitled "ANALOG COMPUTING CONFIGURED MEMORY," filed Mar. 28, 2023, which is assigned to the assignee hereof, and which is expressly incorporated by reference in its entirety herein.

TECHNICAL FIELD

The following relates to one or more systems for memory, including analog computing configured memory.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 5 illustrates a flowchart showing a method or methods that support analog computing configured memory in accordance with examples as disclosed herein.

DETAILED DESCRIPTION

Figure 1:
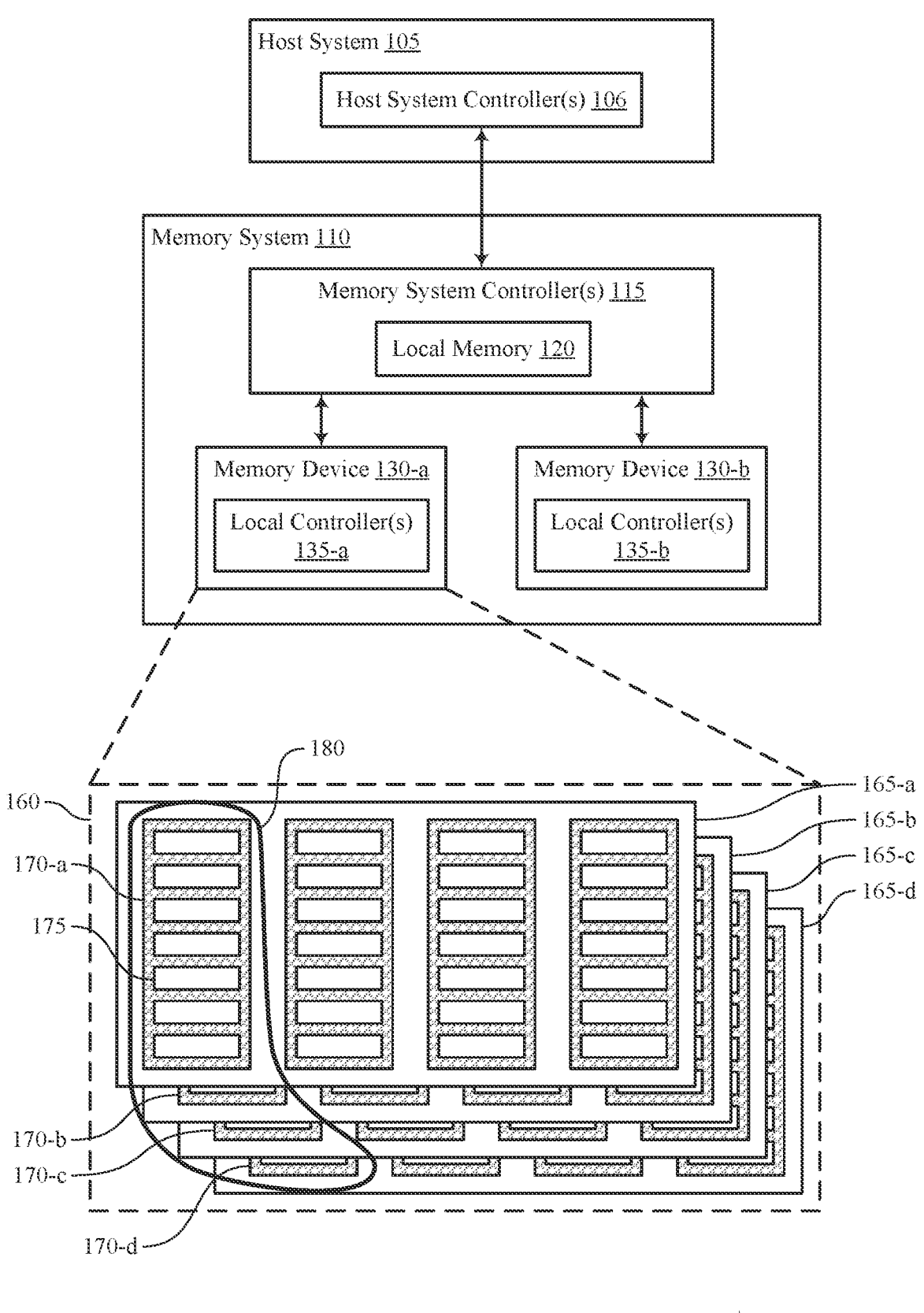
FIG. 1 illustrates an example of a system that supports analog computing configured memory in accordance with examples as disclosed herein.

A system may support a machine learning operation (e.g., a federated learning operation), in which a memory system or a host system may make predictions or decisions. For example, the memory system or the host system may build a model based on input data to make the predictions or decisions according to the instruction of the model. In some cases, one or more components of the memory system may be associated with performing processes for facilitating the machine learning operation. For example, a memory system controller may perform the processes for facilitating the machine learning operation, which may include performing one or more calculations using data stored in a memory array (e.g., a non-volatile memory array) of the memory system.

However, performing the calculations may be associated with high bandwidth utilization by the memory system controller. Further, transferring the data between the memory array and the memory system controller may increase the overall latency of the memory system. Therefore, performing the processes at the memory system controller decreased the bandwidth and increase the latency for performing other operations at the memory system. In some implementations, the memory system may implement (e.g., physically place) the memory system controller at relatively close proximity to the memory array to mitigate the relatively high latency associated with transferring the data. However, such implementations may be relatively spatially inefficient, among other disadvantages.

In accordance with examples as described herein, a memory system may implement a memory array (e.g., non-volatile memory array) with a portion of the memory array configured for performing aspects of a machine learning operation. For example, the memory array may include a first portion (e.g., a first portion of memory cells, such as not-AND (NAND) memory cells) configured for storing data (e.g., host data, data associated with read and write operations), and a second portion (e.g., a second portion of memory cells, such as NAND memory cells) configured to perform analog computing operations associated with the machine learning operation. In some cases, the memory system may include supporting circuitry configured to transfer the data stored in the first portion to the second portion for use in the analog computing operations without transferring the data to a memory system controller, thereby improving latency and conserving bandwidth at the memory system controller.

Additionally, or alternatively, the second portion may be coupled with computing circuitry configured to generate data for the machine learning operation based on the outputs of the analog computing operations performed at the second portion. In some cases, the computing circuitry may be configured to store the data for the machine learning operation to the first portion, or transmit the data for the machine learning operation to the memory system controller. In some such cases, the memory system controller may transmit the data for the machine learning operation to a host system, where the host system may use the data for the machine learning operation to improve a global machine learning algorithm implemented in the memory system and other memory systems (e.g., as in federated learning operations). Therefore, implementing the second portion of the memory array as described herein may decrease the overall latency and increase the overall bandwidth (e.g., compared to previous implementations) of the memory system controller, while retaining relatively high spatial efficiency within the memory system.

Features of the disclosure are initially described in the context of systems, devices, and circuits with reference to FIG. 1. Features of the disclosure are described in the context of a system and a process flow with reference to FIGS. 2 and 3. These and other features of the disclosure are further illustrated by and described in the context of an apparatus diagram and flowchart that relate to analog computing configured memory with reference to FIGS. 4 and 5.

FIG. 1 illustrates an example of a system 100 that supports analog computing configured memory in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with one or more host system controllers 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between one or more host system controllers 106 of the host system 105 and one or more memory system controllers 115 of the memory system 110. In some examples, the host system 105 may be coupled with the memory system 110 (e.g., one or more host system controllers 106 may be coupled with one or more memory system controllers 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, one or more local controllers 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) one or more local controllers 135, which may execute operations on one or more memory cells of the respective memory device 130. A local controller 135 may operate in conjunction with one or more memory system controllers 115 or may perform one or more functions ascribed herein to the one or more memory system controllers 115. For example, as illustrated in FIG. 1, a memory device 130-a may include one or more local controllers 135-a and a memory device 130-b may include one or more local controllers 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that supports analog computing configured memory. For example, the host system 105 (e.g., one or more host system controllers 106), the memory system 110 (e.g., one or more memory system controllers 115), or a memory device 130 (e.g., one or more local controllers 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by one or more host system controllers 106), by the memory system 110 (e.g., by a memory system controller 115), or by a memory device 130 (e.g., by one or more local controllers 135), may cause the host system 105, the memory system 110, or the memory device 130 to perform associated functions as described herein.

In accordance with examples as described herein, the memory system 110 may include a memory array (e.g., associated with one or more of the memory devices 130) with a portion of the memory array configured for performing aspects of a machine learning operation. For example, the memory array may include a first portion (e.g., a first portion of memory cells) configured for storing data (e.g., host data, data associated with read and write operations), and a second portion (e.g., a second portion of memory cells) configured to perform analog computing operations associated with the machine learning operation. In some cases, the memory system 110 may include supporting circuitry configured to transfer the data stored in the first portion to the second portion for use in the analog computing operations without transferring the data to the memory system controller 115, thereby improving latency and conserving bandwidth at the memory system controller.

Additionally, or alternatively, the second portion may be coupled with computing circuitry configured to generate data for the machine learning operation based on the outputs of the analog computing operations performed at the second portion. In some cases, the computing circuitry may be configured to store the data for the machine learning operation to the first portion, or transmit the data for the machine learning operation to the memory system controller 115. In some such cases, the memory system controller 115 may transmit the data for the machine learning operation to the host system 105, where the host system 105 may use the data for the machine learning operation to improve a global machine learning algorithm implemented in the memory system 110 and other memory systems (e.g., as in federated learning operations). Therefore, implementing the second portion of the memory array as described herein may decrease the overall latency and increase the overall bandwidth (e.g., compared to previous implementations) of the memory system controller 115, while retaining relatively high spatial efficiency within the memory system 110.

In addition to applicability in memory systems as described herein, techniques for analog computing configured memory may be generally implemented to support artificial intelligence or machine-learning applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory devices capable of effectively and efficiently storing relatively large quantities of data or accessing stored data relatively quickly. Implementing the techniques described herein may support artificial intelligence and/or machine learning techniques by configuring a portion of NAND memory cells to perform computations and circuitry to perform other computation to support machine learning. Performing computations closer to the where the data is stored can improve the latency of performing machine learning operations and parallelism, among other benefits.

Figure 2:
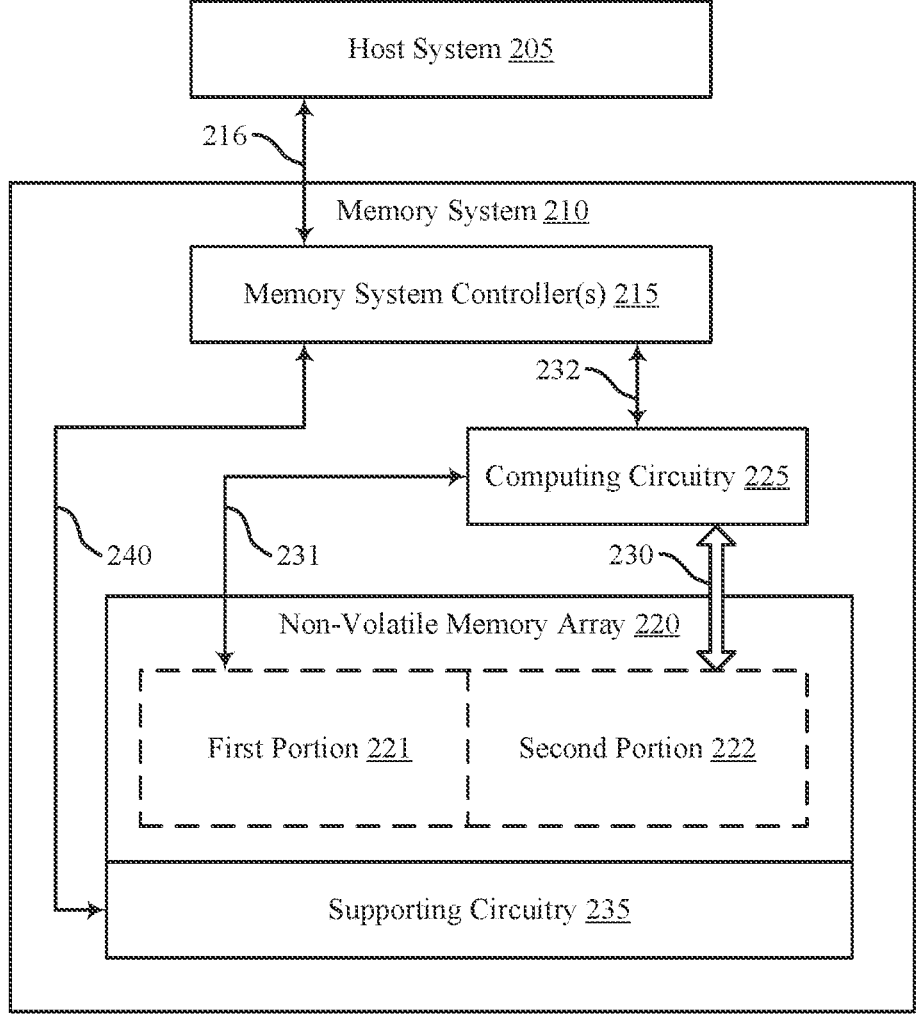
FIG. 2 illustrates an example of a system that supports analog computing configured memory in accordance with examples as disclosed herein.

FIG. 2 illustrates an example of a system 200 that supports analog computing configured memory in accordance with examples as disclosed herein. The system 200 may implement aspects of a system 100, as described with reference to FIG. 1. For example, the system 200 may include a host system 205 and a memory system 210, which may be examples of a host system 105 and a memory system 110, as described with reference to FIG. 1. The system 200 illustrates an example of a non-volatile memory array 220 of the memory system 210 with a portion (e.g., a second portion 222) of the non-volatile memory array 220 configured to perform processes for facilitating a machine learning operation (e.g., a federated learning operation). Implementing the second portion 222 of the non-volatile memory array 220 as described herein may decrease latency associated with performing the machine learning operation, while increasing available bandwidth of a memory system controller otherwise reserved for performing the machine learning operation.

The system 200 may include the memory system 210, which may be operable to communicate with the host system 205 via one or more memory system controllers 215. The one or more memory system controllers 215 may be an example of one or more memory system controllers 115 or one or more local controllers 135, as described with reference to FIG. 1. The memory system controller 215 may be operable to perform operations on the memory system 210 in accordance with commands received from the host system 205. Specifically, the memory system controller 215 may communicate with the host system 205 over a bus 216, where the bus 216 may support transmitting information such as commands, indications, and data, among other information, between the memory system controller 215 and the host system 205.

In some instances, the memory system 210 may include or be an example of a memory die (e.g., a single memory die, a monolithic memory die). The memory die may include the one or more memory system controllers 215, the computing circuitry 225, the non-volatile memory array 220, and the supporting circuitry 235. In other examples, the memory die may include any subset of the one or more memory system controllers 215, the computing circuitry 225, the non-volatile memory array 220, and the supporting circuitry 235.

In some cases, the system 200 may be configured to perform a machine learning operation, in which the host system 205 or the memory system 210 may generate a model to use in making decisions or predictions without explicit programming. For example, the system 200 may be configured to support a federated learning operation, in which a global model may be generated at the host system 205 and transmitted to an implemented node (e.g., at least the memory system 210). The memory system 210 may perform processes for updating a local model (e.g., a version of the global model stored at the memory system 210) and the memory system 210 may transmit local model updates (e.g., updated model parameters, operating parameters, gradients or deltas based on the global model) to the host system 205, where the host system 205 may use the local model updates (e.g., from the memory system 210 and the one or more other memory systems not shown) to update the global model.

In some cases, the federated learning operation may enable the system 200 and one or more other systems 200 (e.g., one or more other memory systems) to create and update local models within the respective memory systems without operating on the global model. The federated learning operation may enable memory systems to collaboratively update the global model without transmitting data (e.g., data used to create the local models) to a centralized storage system. In some cases, privacy concerns or other data integrity concerns may arise from transmitting the underlying data back to a central server to tune the machine learning algorithm. Federated learning is a way to turn a global machine learning algorithm without exchanging the underlying data. Instead, the local system tune its local model and may transmit the local model updates as encrypted communications to preserve user privacy of user data stored at the memory systems. Additionally, because the memory systems do not transmit training data or the local models to the centralized storage system, users of the memory systems may use the local models at the memory systems.

For example, a mobile device may update a local model associated with predictive word usage and transmit the updates to the local model to improve a global model for predictive word usage for a population of mobile devices. However, in some such examples, the mobile device may not transmit indications of word usages of a user of the mobile device, thereby maintaining privacy for the user of the mobile device and enabling the predictive word usage to function while transmitting updates to the local model. Further, updates to the global model may enable future generations of the mobile devices to benefit from improved predictive word usage. Implementing the federated learning operation as described herein may support lower latency, lower power consumption, increased privacy for users of the memory systems, and increased personalization for users of the memory systems.

The system 200 may perform the machine learning operation using a non-volatile memory array 220 (e.g., a NAND array) of the memory system 210. The non-volatile memory array 220 may implement a three dimensional architecture of NAND memory cells, providing a relatively dense arrangement of NAND memory cells in the non-volatile memory array 220. Further, the non-volatile memory array 220 may include a first portion 221 and a second portion 222, which may be physically partitioned from the non-volatile memory array 220 such that the first portion 221 may include a first quantity of memory cells (e.g., a first plurality of NAND memory cells) and the second portion 222 may include a second quantity of memory cells (e.g., a second plurality of NAND memory cells). In some examples, a sum of the first quantity and the second quantity of memory cells may be equal to (e.g., or less than) a total quantity of memory cells of the non-volatile memory array. In some cases, the first portion 221 may be configured to store data (e.g., received from the memory system controller 215), such that each memory cell associated with the first portion 221 may be configured to store one or more bits of data.

In some cases, the second portion 222 of the non-volatile memory array 220 may be configured to perform a set of analog computing operations, which may be associated with facilitating the machine learning operation. For example, each memory cell associated with the second portion 222 may be configured to perform one or more analog computing operations (e.g., or sub-operations). In some examples, data stored in the first portion 221 may be input into the set of analog computing operations, where the set of analog computing operations may include multiplication operations and accumulation operations, among other analog operations. In such examples, one or more voltage levels resulting from performing the set of analog computing operations may be output from the set of analog computing operations. In other examples, one or more analog signals resulting from performing the set of analog computing operations may be output from the set of analog computing operations. Analog computing may include examples of application-specific integrated circuits that may be enabled to hit performance criteria at a lower power consumption. Analog computing may provide various benefits over digital computing, including analog computing is more efficient (e.g., power efficiency) than digital computing and it reduces data movement as compared with digital computing.

The one or more voltage levels or the one or more analog signals may be output directly to computing circuitry 225 coupled with the second portion 222. Outputting the one or more voltage levels or the one or more analog signals directly to the computing circuitry may improve latency at the memory system 210 otherwise associated with performing the computing operations at the one or more memory system controllers 215. For example, transmitting data to the one or more memory system controllers 215 for performing the computing operations to generate data for the machine learning operation may be associated with relatively high latency (e.g., due to a distance of signal paths between the non-volatile memory array 220 and the memory system controller 215, in prior implementations).

The memory system 210 may include the computing circuitry 225 coupled with the second portion 222. The computing circuitry 225 may be configured to generate data for the machine learning operation from the outputs of the set of analog computing operations. For example, the computing circuitry 225 may convert the one or more voltage levels resulting from performing the set of analog computing operations to one or more logic values. In other examples, the computing circuitry 225 may convert the one or more analog signals resulting from performing the set of analog computing operations to digit signals configured to indicate one or more logic values. The computing circuitry 225 may use the one or more logic values to generate data for the machine learning operation, such as updates to the local model, among other possibilities. In some cases, the computing circuitry 225 may be coupled with the first portion 221 (e.g., via a bus 231), such that the computing circuitry 225 may store (e.g., write) the data for the machine learning operation to the first portion 221. In some cases, the computing circuitry 225 may be coupled with the one or more memory system controllers 215 (e.g., via a bus 232), such that the computing circuitry 225 may transmit the data for the machine learning operation to the one or more memory system controllers 215. In some such cases, the one or more memory system controllers 215 may transmit the data to the host system 205. By enabling the computing circuitry 225 to generate the data for the machine learning operation, the one or more memory system controllers 215 may benefit from increased available bandwidth otherwise reserved for generating the data for the machine learning operation using data from the non-volatile memory array 220.

In some cases, the computing circuitry 225 may be bonded with the second portion 222. For example, the computing circuitry 225 may be hybrid bonded (e.g., shown as coupling 230) with the second portion 222 to increase a quantity of connections (e.g., data paths) between the second portion 222 and the computing circuitry 225, allowing for relatively greater quantities of data or signaling to be transferred between the second portion 222 and the computing circuitry 225 in a given time (e.g., resulting in relatively greater data transfer speed or signal speed). In some implementations, hybrid bonding may be used to couple the computing circuitry 225 with the second portion 222 and may include bonding a conductive material of the computing circuitry 225 with a conductive material of the second portion 222 and bonding a dielectric material of the computing circuitry 225 with a dielectric material of the second portion 222. In some examples, hybrid bonding may be an example of a permanent bond that combines a dielectric bond (e.g., SiOx) with an embedded metal (e.g., Cu) to form interconnections.

The memory system 210 may further include supporting circuitry 235 (e.g., second circuitry) coupled with the one or more memory system controllers 215 and the non-volatile memory array 220. In some cases, the supporting circuitry 235 may be an example of a complementary metal-oxide semiconductor (CMOS) formed below the non-volatile memory array 220 (e.g., directionally orthogonal to a substrate of the memory system 210). Moreover, the supporting circuitry 235 may be coupled with the first portion 221 and second portion 222 of the non-volatile memory array 220, such that the supporting circuitry 235 may support transferring data between the first portion 221 and the second portion 222. In some cases, the supporting circuitry 235 may be configured to transfer the data between the first portion 221 and the second portion 222 within the non-volatile memory array 220, without transferring the data to memory system controller 215.

Additionally, or alternatively, the supporting circuitry 235 may be configured to receive data from the one or more memory system controllers 215 (e.g., via a bus 240) and store (e.g., write) the data to the first portion 221. For example, the supporting circuitry 235 may receive data from the one or more memory system controllers 215, store the data to the first portion 221, and transfer the data from the first portion 221 to the second portion 222, where the second portion 222 may use the data transferred from the first portion 221 as the input to the set of analog computing operations.

In accordance with examples as described herein, the second portion 222 may be configured to perform the analog computing operations which may support the machine learning operation at the system 200. Configuring the second portion 222 of existing NAND memory cells to perform the analog computing operations may enable the system 200 to implement the machine learning operation without utilizing the one or more memory system controllers 215 to generate the data for the machine learning operation. Therefore, the system 200 may benefit from relatively decreased latency and improved bandwidth at the one or more memory system controllers 215.

Figure 3:
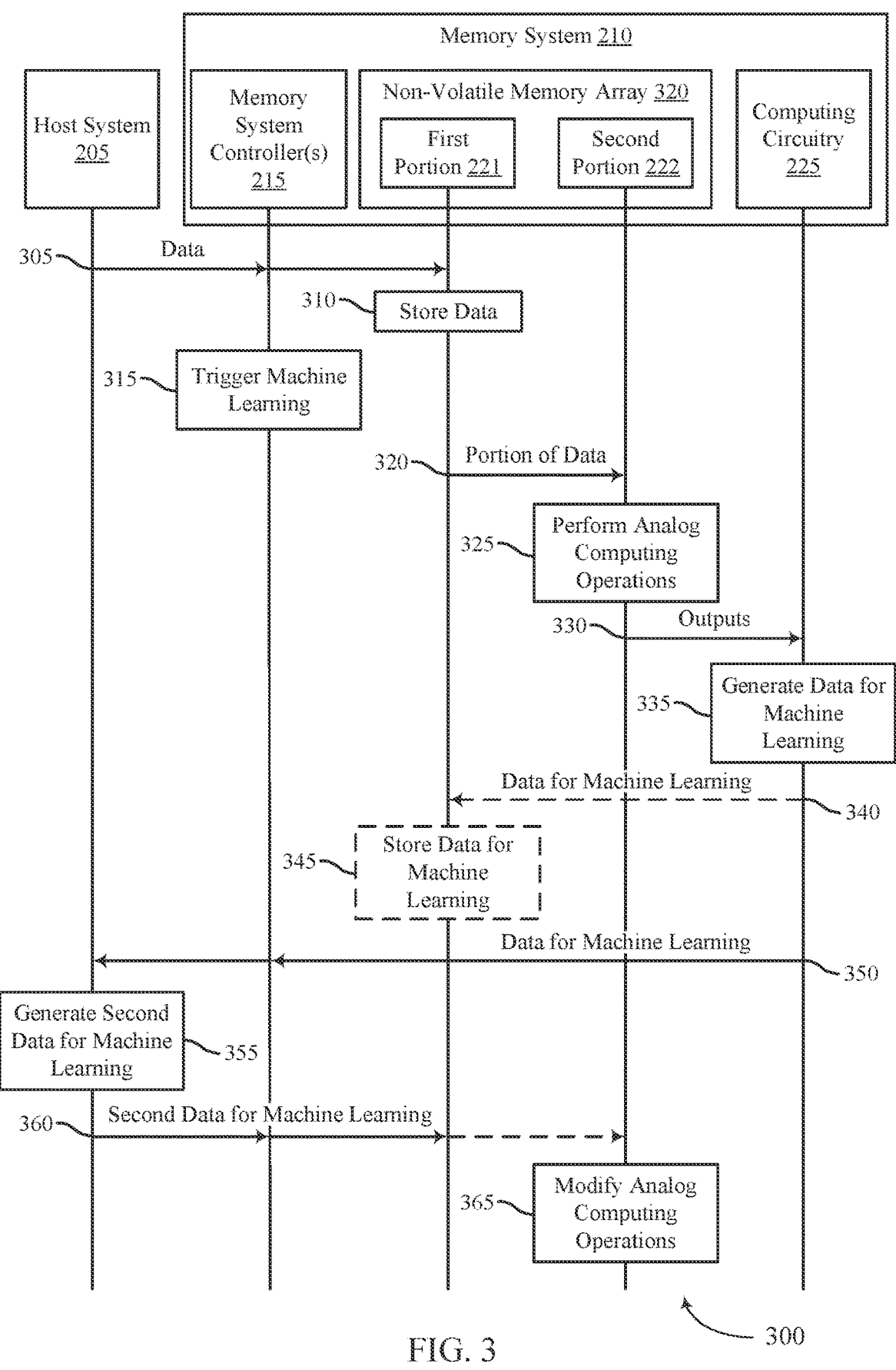
FIG. 3 illustrates an example of a process flow that supports analog computing configured memory in accordance with examples as disclosed herein.

FIG. 3 illustrates an example of a process flow 300 that supports analog computing configured memory in accordance with examples as disclosed herein. The process flow 300 may illustrate aspects or operations of a system 100 and a system 200, as described with reference to FIGS. 1 and 2, respectively. For example, the process flow 300 may depict operations at a host system 205 and a memory system 210 which includes one or more memory system controllers 215, a non-volatile memory array 220 with a first portion 221 and a second portion 222, and computing circuitry 225, as described with reference to FIG. 2. In the following description of the process flow 300, the methods, techniques, processes, and operations may be performed in different orders or at different times. Further, certain operations may be left out of the process flow 300, or other operations may be added to the process flow 300. The process flow 300 illustrates operations in which a portion (e.g., a second portion 222) of a non-volatile memory array 220 of a memory system 210 is configured to perform processes for facilitating a machine learning operation.

At 305, the host system 205 may transmit data to the memory system 210. The memory system controller 215 may receive the data for the memory system 210 and transmit the data to the first portion 221. In some cases, the data may be data associated with a write command. In other cases, the data may be associated with the machine learning operation. For example, the data may be a global model associated with a federated learning operation or updates for a local model stored at the memory system 210 (e.g., stored at the first portion 221), among other possibilities.

At 310, the data may be stored to the first portion 221. In some cases, the data may be transmitted from the memory system controller 215 to supporting circuitry 235 (e.g., not shown), where the supporting circuitry 235 may store (e.g., write) the data to the first portion 221, as described with reference to FIG. 2. In other cases, the data may be written directly from the memory system controller 215 to the first portion 221.

At 315, the machine learning operation may be triggered. In some cases, the memory system controller 215 may trigger the machine learning operation based on a periodic schedule or based on determining a quantity of elapsed time (e.g., that at least a portion of the data has been maintained in the first portion 221 for a duration, or from a duration since performing a prior machine learning operation) satisfies a threshold (e.g., a threshold of elapsed time). In some cases, the machine learning operation may be triggered based on receiving a command (e.g., based on the memory system controller 215 receiving a command) from the host system 205 indicating to initialize the machine learning operation. In other cases, the memory system controller 215 may trigger the machine learning operation based on storing the data to the first portion 221 at step 310.

At 320, the data may be transferred from the first portion 221 to the second portion 222. For example, the supporting circuitry 235 may transfer the data from the first portion 221 to the second portion 222, without transferring the data between the memory system controller 215. In some such examples, the supporting circuitry 235 may be coupled with the non-volatile memory array 220 such that the data may not be transferred outside the non-volatile memory array 220 when transferring the data between the first portion 221 and the second portion 222. In some cases, the data transferred may be a subset of the data stored to the first portion 221 at 310.

At 325, the second portion 222 may perform a set of analog computing operations on the data transferred from the first portion 221. For example, the data transferred from the first portion 221 may be input into the set of analog computing operations associated with memory cells of the second portion 222 and one or more voltage levels or one or more analog signals resulting from performing the set of the analog computing operations at the second portion 222 may be output.

At 330, the outputs from the set of analog computing operations may be transferred from the second portion 222 to the computing circuitry 225. The outputs may include the one or more voltage levels or the one or more analog signals resulting from performing the set of analog computing operations.

At 335, the computing circuitry 225 may generate data for the machine learning operation based on the received outputs from the set of analog computing operations performed at the second portion 222. For example, the computing circuitry 225 may convert the one or more voltage levels received from the second portion 222 to one or more corresponding logic values, or the computing circuitry 225 may convert the one or more analog signals received from the second portion 222 to one or more digital signals indicating the one or more corresponding logic values. After generating the data for the machine learning operation at the computing circuitry 225, the process flow 300 may continue to step 340 or step 350.

At 340, the computing circuitry 225 may transfer the data for the machine learning operation to the first portion 221. In some cases, the computing circuitry 225 may transfer the data for the machine learning operation to the supporting circuitry 235 and the supporting circuitry 235 may transfer the data for the machine learning operation to the first portion 221. In some cases, the computing circuitry 225 may transfer the data for the machine learning operation to the memory system controller 215 and the memory system controller 215 may transmit the data for the machine learning operation to the first portion 221 or to the supporting circuitry 235 for storing at the first portion 221.

At 345, the data for the machine learning operation may be stored to the first portion 221. In some cases, the supporting circuitry 235 may store the data for the machine learning operation to the first portion 221. In other cases, the memory system controller 215 may store the data for the machine learning operation to the first portion 221.

At 350, the computing circuitry 225 may transmit the data for the machine learning operation to the memory system controller 215. The memory system controller 215 may transmit the data for the machine learning operation to the host system 205 based on receiving the data for the machine learning operation from the computing circuitry 225.

At 355, the host system 205 may generate second data for the machine learning operation. In some cases, the data for the machine learning operation may include updates to the local model stored at the memory system 210 (e.g., stored at the first portion 221), where generating the second data for the machine learning operation may include updating the global model based on the updates to the local model. Thus, the second data for the machine learning operation may be an updated global model or modifications to the local model stored at the memory system 210.

At 360, the host system 205 may transmit the second data for the machine learning operation to the memory system controller 215. The memory system controller 215 may transmit the second data for the machine learning operation to the first portion 221. In some cases, the memory system controller 215 may transmit the second data for the machine learning operation to the supporting circuitry 235, where the supporting circuitry 235 may store (e.g., write) the data to the first portion 221. In other cases, the memory system controller 215 may write the second data for the machine learning operation directly to the first portion 221.

At 365, the set of analog computing operations may be modified based on the second data for the machine learning operation. For example, the memory cells associated with the second portion 222 may be modified such that the memory cells may perform the set of modified analog computing operations.

In accordance with the operations of the process flow 300 as described herein, the second portion 222 may be configured to perform the analog computing operations which may support the machine learning operation. Configuring the second portion 222 of existing memory cells to perform the analog computing operations may enable the machine learning operation to be performed without utilizing the memory system controller 215 to generate the data for the machine learning operation. Therefore, the memory system controller 215 may benefit from relatively decreased latency and improved bandwidth.

Figure 4:
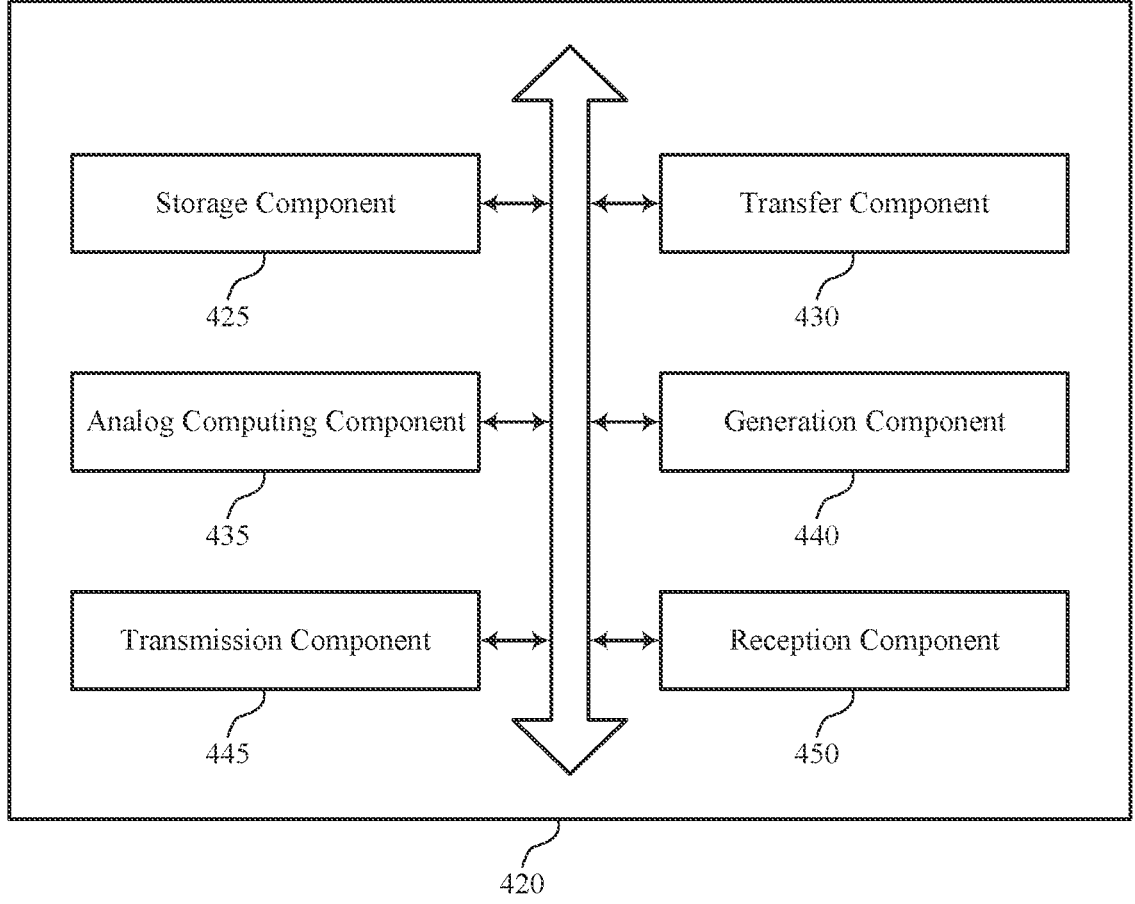
FIG. 4 illustrates a block diagram of a memory system that supports analog computing configured memory in accordance with examples as disclosed herein.

FIG. 4 illustrates a block diagram 400 of a memory system 420 that supports analog computing configured memory in accordance with examples as disclosed herein. The memory system 420 may be an example of aspects of a memory system as described with reference to FIGS. 1 through 3. The memory system 420, or various components thereof, may be an example of means for performing various aspects of analog computing configured memory as described herein. For example, the memory system 420 may include a storage component 425, a transfer component 430, an analog computing component 435, a generation component 440, a transmission component 445, a reception component 450, or any combination thereof. Each of these components may communicate, directly or indirectly, with one another (e.g., via one or more buses).

The storage component 425 may be configured as or otherwise support a means for storing data to a first portion of a non-volatile memory array. The transfer component 430 may be configured as or otherwise support a means for transferring a subset of the data from the first portion of the non-volatile memory array to a second portion of the non-volatile memory array for performing analog computing operations. The analog computing component 435 may be configured as or otherwise support a means for performing, at the second portion of the non-volatile memory array, one or more of the analog computing operations on the subset of the data based on transferring the subset of the data from the first portion of the non-volatile memory array to the second portion of the non-volatile memory array. The generation component 440 may be configured as or otherwise support a means for generating, by circuitry coupled with the second portion of the non-volatile memory array, data associated with a machine learning operation based on one or more outputs of the analog computing operations performed on the subset of the data.

In some examples, the storage component 425 may be configured as or otherwise support a means for storing the data associated with the machine learning operation to the first portion of the non-volatile memory array based on generating the data associated with the machine learning operation.

In some examples, the transmission component 445 may be configured as or otherwise support a means for transmitting the data associated with the machine learning operation from the circuitry to a controller coupled with the circuitry based on generating the data associated with the machine learning operation.

In some examples, the transmission component 445 may be configured as or otherwise support a means for transmitting the data associated with the machine learning operation from the controller to a host system based on generating the data associated with the machine learning operation.

In some examples, the reception component 450 may be configured as or otherwise support a means for receiving, by the controller, second data associated with the machine learning operation from the host system based on transmitting the data associated with the machine learning operation from the controller to the host system, the second data associated with the machine learning operation including updated data associated with the machine learning operation. In some examples, the storage component 425 may be configured as or otherwise support a means for storing the second data associated with the machine learning operation to the first portion of the non-volatile memory array based on receiving the second data associated with the machine learning operation.

In some examples, the analog computing component 435 may be configured as or otherwise support a means for modifying one or more of the analog computing operations based on storing the second data associated with the machine learning operation to the first portion of the non-volatile memory array.

In some examples, to support transferring the subset of the data from the first portion of the non-volatile memory array to the second portion of the non-volatile memory array, the transfer component 430 may be configured as or otherwise support a means for transferring the subset of the data within the non-volatile memory array via second circuitry coupled with the first portion of the non-volatile memory array and the second portion of the non-volatile memory array.

In some examples, the transfer component 430 may be configured as or otherwise support a means for refraining from transmitting the subset of the data to a controller coupled with the second circuitry.

In some examples, the reception component 450 may be configured as or otherwise support a means for receiving a command to perform the machine learning operation, where transferring the subset of the data from the first portion of the non-volatile memory array to the second portion of the non-volatile memory array is based on receiving the command.

FIG. 5 illustrates a flowchart showing a method 500 that supports analog computing configured memory in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include storing data to a first portion of a non-volatile memory array. The operations of 505 may be performed in accordance with examples as disclosed herein. In some examples, aspects of the operations of 505 may be performed by a storage component 425 as described with reference to FIG. 4. For example, the memory system 210 may include a storage component 425 at the memory system controller 215 or the supporting circuitry 235 that may store the data to the first portion 221 of the non-volatile memory array 220, as described with reference to FIG. 2. In some cases, aspects of the operations of 505 may be described at steps 305 and 310 of FIG. 3.

At 510, the method may include transferring a subset of the data from the first portion of the non-volatile memory array to a second portion of the non-volatile memory array for performing analog computing operations. The operations of 510 may be performed in accordance with examples as disclosed herein. In some examples, aspects of the operations of 510 may be performed by a transfer component 430 as described with reference to FIG. 4. For example, the memory system 210 may include a transfer component 430 at the supporting circuitry 235 that may transfer the subset of the data from the first portion 221 of the non-volatile memory array 220 to the second portion 222 of the non-volatile memory array 220 for performing analog computing operations, as described with reference to FIG. 2. In some cases, aspects of the operations of 510 may be described at step 320 of FIG. 3.

At 515, the method may include performing, at the second portion of the non-volatile memory array, one or more of the analog computing operations on the subset of the data based on transferring the subset of the data from the first portion of the non-volatile memory array to the second portion of the non-volatile memory array. The operations of 515 may be performed in accordance with examples as disclosed herein. In some examples, aspects of the operations of 515 may be performed by an analog computing component 435 as described with reference to FIG. 4. For example, the memory system 210 may include an analog computing component 435 at the second portion 322 of the non-volatile memory array 220 that may perform the one or more of the analog computing operations on the subset of the data received from the first portion 221 of the non-volatile memory array 220, as described with reference to FIG. 2. In some cases, aspects of the operations of 505 may be described at step 325 of FIG. 3.

At 520, the method may include generating, by circuitry coupled with the second portion of the non-volatile memory array, data associated with a machine learning operation based on one or more outputs of the analog computing operations performed on the subset of the data. The operations of 520 may be performed in accordance with examples as disclosed herein. In some examples, aspects of the operations of 520 may be performed by a generation component 440 as described with reference to FIG. 4. For example, the memory system 210 may include a generation component 440 at the computing circuitry 225 that may generate the data associated with the machine learning operation based on the one or more received outputs of the analog computing operations performed at the second portion 222 of the non-volatile memory array 220, as described with reference to FIG. 2. In some cases, aspects of the operations of 505 may be described at steps 330 and 335 of FIG. 3.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for storing data to a first portion of a non-volatile memory array; transferring a subset of the data from the first portion of the non-volatile memory array to a second portion of the non-volatile memory array for performing analog computing operations; performing, at the second portion of the non-volatile memory array, one or more of the analog computing operations on the subset of the data based on transferring the subset of the data from the first portion of the non-volatile memory array to the second portion of the non-volatile memory array; and generating, by circuitry coupled with the second portion of the non-volatile memory array, data associated with a machine learning operation based on one or more outputs of the analog computing operations performed on the subset of the data.

Aspect 2: The method, apparatus, or non-transitory computer-readable medium of aspect 1, further including operations, features, circuitry, logic, means, or instructions, or any combination thereof for storing the data associated with the machine learning operation to the first portion of the non-volatile memory array based on generating the data associated with the machine learning operation.

Aspect 3: The method, apparatus, or non-transitory computer-readable medium of any of aspects 1 through 2, further including operations, features, circuitry, logic, means, or instructions, or any combination thereof for transmitting the data associated with the machine learning operation from the circuitry to a controller coupled with the circuitry based on generating the data associated with the machine learning operation.

Aspect 4: The method, apparatus, or non-transitory computer-readable medium of aspect 3, further including operations, features, circuitry, logic, means, or instructions, or any combination thereof for transmitting the data associated with the machine learning operation from the controller to a host system based on generating the data associated with the machine learning operation.

Aspect 5: The method, apparatus, or non-transitory computer-readable medium of aspect 4, further including operations, features, circuitry, logic, means, or instructions, or any combination thereof for receiving, by the controller, second data associated with the machine learning operation from the host system based on transmitting the data associated with the machine learning operation from the controller to the host system, the second data associated with the machine learning operation including updated data associated with the machine learning operation and storing the second data associated with the machine learning operation to the first portion of the non-volatile memory array based on receiving the second data associated with the machine learning operation.

Aspect 6: The method, apparatus, or non-transitory computer-readable medium of aspect 5, further including operations, features, circuitry, logic, means, or instructions, or any combination thereof for modifying one or more of the analog computing operations based on storing the second data associated with the machine learning operation to the first portion of the non-volatile memory array.

Aspect 7: The method, apparatus, or non-transitory computer-readable medium of any of aspects 1 through 6, where transferring the subset of the data from the first portion of the non-volatile memory array to the second portion of the non-volatile memory array includes operations, features, circuitry, logic, means, or instructions, or any combination thereof for transferring the subset of the data within the non-volatile memory array via second circuitry coupled with the first portion of the non-volatile memory array and the second portion of the non-volatile memory array.

Aspect 8: The method, apparatus, or non-transitory computer-readable medium of aspect 7, further including operations, features, circuitry, logic, means, or instructions, or any combination thereof for refraining from transmitting the subset of the data to a controller coupled with the second circuitry.

Aspect 9: The method, apparatus, or non-transitory computer-readable medium of any of aspects 1 through 8, further including operations, features, circuitry, logic, means, or instructions, or any combination thereof for receiving a command to perform the machine learning operation, where transferring the subset of the data from the first portion of the non-volatile memory array to the second portion of the non-volatile memory array is based on receiving the command.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 10: A memory system, including: a controller; a non-volatile memory array coupled with the controller, the non-volatile memory array including a first portion configured for storing data received from the controller and a second portion configured for performing a plurality of analog computing operations on data received from the first portion; and circuitry coupled with the second portion of the non-volatile memory array and configured to generate data associated with a machine learning operation based on one or more outputs of the plurality of analog computing operations.

Aspect 11: The memory system of aspect 10, further including: second circuitry coupled with the first portion and the second portion of the non-volatile memory array and configured to transfer data between the first portion and the second portion of the non-volatile memory array.

Aspect 12: The memory system of aspect 11, where the second circuitry is configured to transfer the data between the first portion and the second portion of the non-volatile memory array absent transferring the data to the controller.

Aspect 13: The memory system of any of aspects 10 through 12, where: the first portion includes a plurality of non-volatile memory cells configured to store bits of data, and the second portion includes a second plurality of non-volatile memory cells, each non-volatile memory cell of the second plurality of non-volatile memory cells configured to perform one or more analog computing operations of the plurality of analog computing operations.

Aspect 14: The memory system of any of aspects 10 through 13, where the circuitry is hybrid bonded to the second portion via a conductive material of the circuitry being bonded with a conductive material of the second portion and a dielectric material of the circuitry being bonded with a dielectric material of the second portion.

Aspect 15: The memory system of any of aspects 10 through 14, where the circuitry is coupled with the controller via a bus that is configured to transmit the data associated with the machine learning operation to the controller.

Aspect 16: The memory system of any of aspects 10 through 15, where the circuitry is configured to store the data associated with the machine learning operation to the first portion.

Aspect 17: The memory system of any of aspects 10 through 16, where the one or more outputs of the plurality of analog computing operations are associated with one or more voltage levels resulting from performing the plurality of analog computing operations, and the circuitry is configured to generate the data associated with the machine learning operation based on converting the one or more voltage levels to respective logic values.

Aspect 18: The memory system of any of aspects 10 through 17, where the machine learning operation includes a federated learning operation.

Aspect 19: The memory system of any of aspects 10 through 18, where the one or more outputs of the plurality of analog computing operations are associated with respective tunable weights for the machine learning operation.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more controllers; and
a memory die coupled with the one or more controllers and comprising:
a non-volatile memory array comprising a first portion configured for storing data received from the one or more controllers and a second portion configured for performing a plurality of analog computing operations on data received from the first portion;
circuitry coupled with the second portion of the non-volatile memory array and configured to generate data associated with a machine learning operation based on one or more outputs of the plurality of analog computing operations; and
second circuitry coupled with the first portion and the second portion of the non-volatile memory array and configured to transfer data between the first portion and the second portion of the non-volatile memory array, wherein the second circuitry is configured to transfer the data between the first portion and the second portion of the non-volatile memory array absent transferring the data to the one or more controllers.

2. The memory system of claim 1, wherein:
the first portion comprises a plurality of non-volatile memory cells configured to store bits of data, and
the second portion comprises a second plurality of non-volatile memory cells, each non-volatile memory cell of the second plurality of non-volatile memory cells configured to perform one or more analog computing operations of the plurality of analog computing operations.

3. The memory system of claim 1, wherein the circuitry is hybrid bonded to the second portion via a conductive material of the circuitry being bonded with a conductive material of the second portion and a dielectric material of the circuitry being bonded with a dielectric material of the second portion.

4. The memory system of claim 1, wherein the circuitry is coupled with the one or more controllers via a bus that is configured to transmit the data associated with the machine learning operation to the one or more controllers.

5. The memory system of claim 1, wherein the circuitry is configured to store the data associated with the machine learning operation to the first portion.

6. The memory system of claim 1, wherein:

the one or more outputs of the plurality of analog computing operations are associated with one or more voltage levels resulting from performing the plurality of analog computing operations, and the circuitry is configured to generate the data associated with the machine learning operation based on converting the one or more voltage levels to respective logic values.

7. The memory system of claim 1, wherein the machine learning operation comprises a federated learning operation.

8. The memory system of claim 1, wherein the one or more outputs of the plurality of analog computing operations are associated with respective tunable weights for the machine learning operation.

9. A method, comprising:

storing data to a first portion of a non-volatile memory array;

transferring a subset of the data from the first portion of the non-volatile memory array to a second portion of the non-volatile memory array for performing analog computing operations based at least in part on transferring the subset of the data within the non-volatile memory array via second circuitry coupled with the first portion of the non-volatile memory array and the second portion of the non-volatile memory array;

refraining from transmitting the subset of the data to one or more controllers coupled with the second circuitry;

performing, at the second portion of the non-volatile memory array, one or more of the analog computing operations on the subset of the data based on transferring the subset of the data from the first portion of the non-volatile memory array to the second portion of the non-volatile memory array; and generating, by circuitry coupled with the second portion of the non-volatile memory array, data associated with a machine learning operation based on one or more outputs of the analog computing operations performed on the subset of the data.

10. The method of claim 9, further comprising:

storing the data associated with the machine learning operation to the first portion of the non-volatile memory array based on generating the data associated with the machine learning operation.

11. The method of claim 9, further comprising:

transmitting the data associated with the machine learning operation from the circuitry to one or more controllers coupled with the circuitry based on generating the data associated with the machine learning operation.

12. The method of claim 11, further comprising:

transmitting the data associated with the machine learning operation from the one or more controllers to a host system based on generating the data associated with the machine learning operation.

13. The method of claim 12, further comprising:

receiving, by the one or more controllers, second data associated with the machine learning operation from the host system based on transmitting the data associated with the machine learning operation from the one or more controllers to the host system, the second data associated with the machine learning operation comprising updated data associated with the machine learning operation; and storing the second data associated with the machine learning operation to the first portion of the non-volatile memory array based on receiving the second data associated with the machine learning operation.

14. The method of claim 13, further comprising:

modifying one or more of the analog computing operations based on storing the second data associated with the machine learning operation to the first portion of the non-volatile memory array.

15. The method of claim 9, further comprising:

receiving a command to perform the machine learning operation, wherein transferring the subset of the data from the first portion of the non-volatile memory array to the second portion of the non-volatile memory array is based on receiving the command.

16. An apparatus, comprising:

a non-volatile memory array comprising a first portion, and a second portion for performing analog computing operations;

supporting circuitry coupled with the non-volatile memory array and configured to cause the apparatus to:

store data to the first portion of the non-volatile memory array;

transfer a subset of the data from the first portion of the non-volatile memory array to the second portion of the non-volatile memory array based at least in part on transferring the subset of the data within the non-volatile memory array via second circuitry coupled with the first portion of the non-volatile memory array and the second portion of the non-volatile memory array;

refrain from transmitting the subset of the data to one or more controllers coupled with the second circuitry; and perform, at the second portion of the non-volatile memory array, one or more of the analog computing operations on the subset of the data based on transferring the subset of the data from the first portion of the non-volatile memory array to the second portion of the non-volatile memory array; and computing circuitry coupled with the second portion of the non-volatile memory array and configured to cause the apparatus to:

generate data associated with a machine learning operation based on one or more outputs of the analog computing operations performed on the subset of the data.

17. A memory system, comprising:

one or more controllers; and a memory die coupled with the one or more controllers and comprising:

a non-volatile memory array comprising a first portion configured for storing data received from the one or more controllers and a second portion configured for performing a plurality of analog computing operations on data received from the first portion; and circuitry coupled with the second portion of the non-volatile memory array and configured to generate data associated with a machine learning operation based on one or more outputs of the plurality of analog computing operations, wherein the circuitry is coupled with the one or more controllers via a bus that is configured to transmit the data associated with the machine learning operation to the one or more controllers.

18. A method, comprising:

storing data to a first portion of a non-volatile memory array;

transferring a subset of the data from the first portion of the non-volatile memory array to a second portion of the non-volatile memory array for performing analog computing operations;

performing, at the second portion of the non-volatile memory array, one or more of the analog computing operations on the subset of the data based on transferring the subset of the data from the first portion of the non-volatile memory array to the second portion of the non-volatile memory array;

generating, by circuitry coupled with the second portion of the non-volatile memory array, data associated with a machine learning operation based on one or more outputs of the analog computing operations performed on the subset of the data;

transmitting the data associated with the machine learning operation from the circuitry to one or more controllers coupled with the circuitry based on generating the data associated with the machine learning operation;

transmitting the data associated with the machine learning operation from the one or more controllers to a host system based on generating the data associated with the machine learning operation;

receiving, by the one or more controllers, second data associated with the machine learning operation from the host system based on transmitting the data associated with the machine learning operation from the one or more controllers to the host system, the second data associated with the machine learning operation comprising updated data associated with the machine learning operation; and storing the second data associated with the machine learning operation to the first portion of the non-volatile memory array based on receiving the second data associated with the machine learning operation.

* * * * *